United States Patent [19]
Nelson

[11] 3,828,193
[45] Aug. 6, 1974

[54] METHOD AND APPARATUS FOR DETECTING PARTIALLY-FILLED OR ABSENT CONTAINERS IN A SEALED SHIPPING CARTON

[75] Inventor: Lloyd A. Nelson, Fremont, Mich.
[73] Assignee: Gerber Products Company, Fremont, Mich.
[22] Filed: Aug. 11, 1971
[21] Appl. No.: 172,354

Related U.S. Application Data
[63] Continuation-in-part of Ser. No. 122,880, March 10, 1971, abandoned.

[52] U.S. Cl.............. 250/360, 209/111.5, 250/308
[51] Int. Cl. ......................................... G01n 23/10
[58] Field of Search............. 250/83.3 D, 52, 223 B; 209/111.5

[56]     References Cited
         UNITED STATES PATENTS
2,885,557   5/1959   Kizaur............................ 250/83.3 D
3,016,460   1/1962   Andresen........................ 250/83.3 D
3,560,745   2/1971   Petersen .......................... 250/52 X
3,587,855   6/1971   Roy.................................. 209/111.5
3,697,754   10/1972  Maxwell........................ 250/83.3 D

*Primary Examiner*—Archie R. Borchelt
*Attorney, Agent, or Firm*—Townsend and Townsend

[57]     ABSTRACT

A non-destructive method and apparatus for determining the presence of broken or missing containers in a sealed opaque shipping case, including a source of γ-rays directed at the case, means for detecting variations in γ-ray radiation at a fixed point as the case passes between the γ-ray source and the detecting means, and means responsive to the variations for isolating any shipping case found to contain broken or missing containers.

14 Claims, 3 Drawing Figures

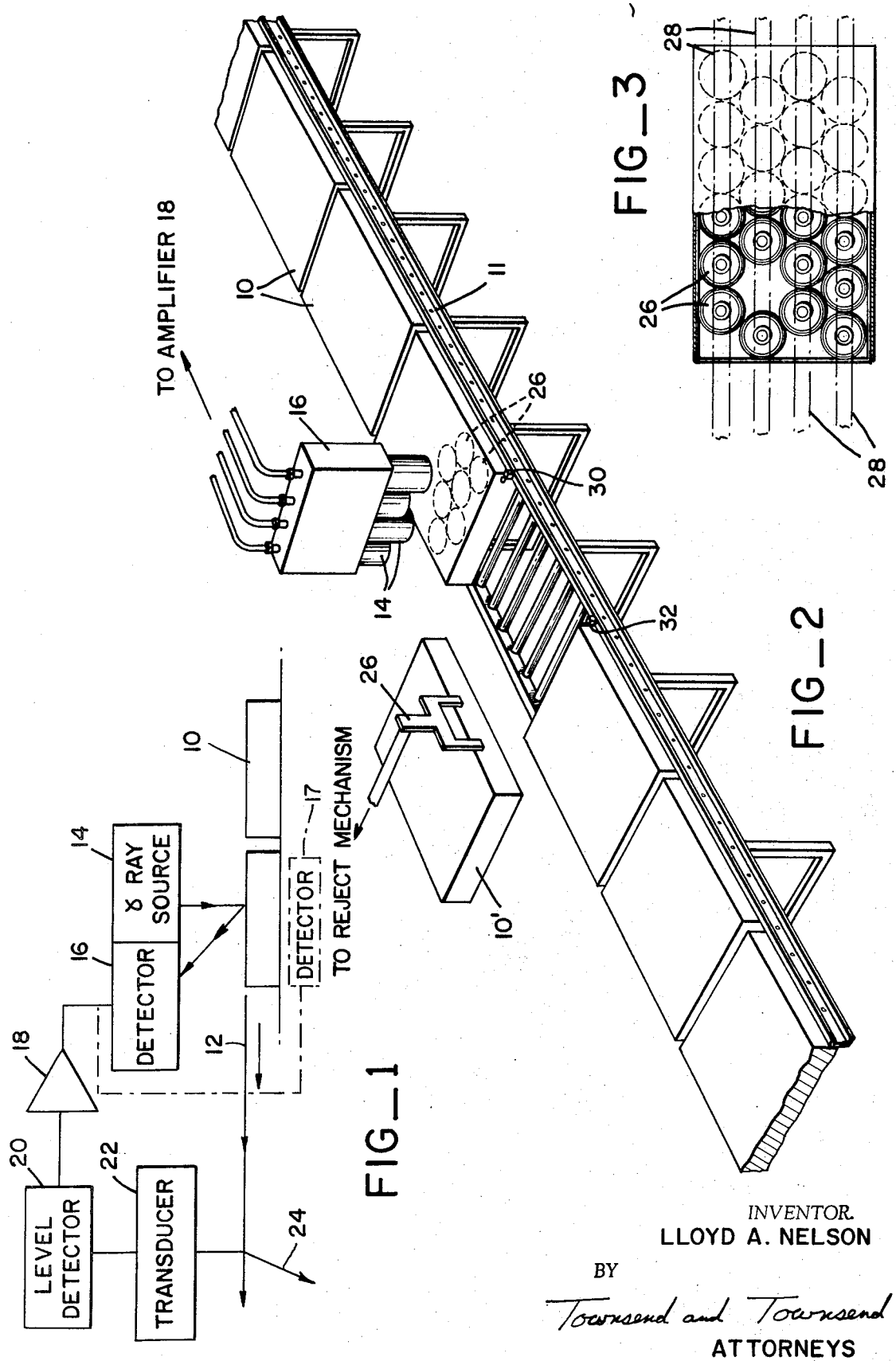

METHOD AND APPARATUS FOR DETECTING PARTIALLY-FILLED OR ABSENT CONTAINERS IN A SEALED SHIPPING CARTON

This application is a continuation-in-part application of the copending patent application bearing Ser. No. 122,880, filed Mar. 10, 1971, and entitled "In-Case Broken Jar and Void Detector", and now abandoned.

BACKGROUND OF THE INVENTION

1. Field of the Invention

This invention relates to a method and apparatus for the non-destructive examination of opaque, sealed shipping cases of containers to determine the presence of broken, missing or even partially filled containers within such a shipping case. More particularly, the invention is directed to monitoring shipping cases of staggered, comestible-containing baby food jars to ensure the absence of imperfections in forming and filling the shipping case with the jars.

The use of automated equipment to enclose containers of comestibles in sealed, opaque shipping cartons has long been practiced. More recently, and in particular in the baby food industry, equipment has been developed to simultaneously form a shipping case and enclose a plurality of staggered glass jars, usually in four contacting rows of six jars each. Although the likelihood of occasional jar breakage and/or jar misalignment is slight either in conventional on-diameter, partitioned packaging or with newer techniques, it has not previously been possible to determine the presence of such imperfections in sealed opaque shipping cases. In addition, it has not been possible to detect partially empty jars.

It is, therefore, a primary object of this invention to provide an apparatus for detecting the existence of broken, partially filled, or missing jars in a sealed opaque shipping case.

More particularly, it is an object of the present invention to be able to monitor closed and sealed wrap-around opaque shipping cases containing staggered glass jars.

It is a further object of this invention to accomplish monitoring of stagger-pack wrap-around shipping cases of glass jars without destroying the integrity of the sealed shipping case.

Other objects as well as features and advantages of this invention will become apparent from consideration of the following specification, particularly in view of the attached drawings, wherein:

FIG. 1 is a schematic diagram of one embodiment of applicant's invention;

FIG. 2 is a perspective diagram illustrating operation of a portion of an apparatus suitable for this invention;

FIG. 3 is a cross-sectional view illustrating an incompletely filled shipping case of containers capable of being identified through the use of applicant's invention.

The use of a beam of highly penetrative particles such as from a source of $\gamma$ radiation has heretofore been used to determine the density or specific gravity of inaccessible fluids such as those in a closed container or a pipe line without the necessity of any direct contact with the fluid. Such devices, radiation gauges, are exemplified by that disclosed in U.S. Pat. No. 2,304,910.

A radiation gauge is an instrument that utilizes the basic physical principle, that when a stream of $\gamma$-rays is injected into a material, a phenomenon known as Compton Scattering is observed. This scattering has both angular and energy dependent relationships, which are a function both of the initial energy and the material into which the $\gamma$-rays are injected. Because of the aforementioned relationships, there are two basic types of radiation gauges, backscatter and transmission. The backscatter gauge, as its name implies, basically looks at and evaluates the radiation which is scattered at angles near 180° from the direction of emission. The transmission gauge basically looks at changes in the amount of transmitted radiation.

The radiation gauge employs a source of $\gamma$-rays such as cobalt 60 or cesium 137 disposed in close proximity to the outside of the vessel or pipe containing the fluid. The source is shielded in such a manner so that all radiation is absorbed except that directed in a narrow path, i.e., a collimated beam, towards the medium to be investigated. A detector is positioned for measuring that portion of the $\gamma$-ray beam that has been transmitted or scattered in a predetermined limited region from the medium being measured. The detecting device is normally connected to a suitable instrument, e.g., scintillation or Geiger counter, for indicating the concentration of $\gamma$-rays transmitted or backscattered into the particular region in question.

It has now been found that detection of $\gamma$ radiation backscatter or transmission from a $\gamma$-ray beam directed generally perpendicular to the upper (or lower) surface of a container-filled opaque shipping case moving relative to the $\gamma$ radiation source, can provide an indication of the condition of the containers within the sealed carton. Thus it is now possible to monitor such shipping cases to determine whether individual containers are missing, only partially filled, or in fact broken, without destroying the integrity of the sealed carton.

Although it is not intended that this invention be limited to any specific theoretical concept, it appears that the density of radiation detected from the beam of $\gamma$-rays directed into the aforementioned type of shipping case is proportional to the amount of the material in each container irrespective of the density of the cover of the individual containers. Thus the cover density does not appear to be controlling as the presence or absence of the comestible within the container, in addition to the actual absence of a container, actually produces variations in the density of radiation detected from the shipping case.

Referring now to the drawings wherein similar characters of reference represent corresponding parts in each of the several views, FIG. 1 contains an embodiment of the apparatus as schematically illustrated therein. Thus, container-filled opaque, sealed shipping case 10 is disposed to be advanced along path 12 that intersects a collimated beam of $\gamma$-rays from source 14. As case 10 passes through beam 12, $\gamma$-rays are backscattered to $\gamma$-ray detector 16 or are transmitted through the case and detected by a $\gamma$-ray detector 17 e.g. Geiger counters positioned, immediately below the case and in a straight line with the $\gamma$-ray beam. While only the detector 16 will be discussed, it is understood that detector 16 is exemplary for detecting radiation from backscatter or transmissions. Detector 16 is preferably a conventional scintillation counter, such as described in the McGraw-Hill Encyclopedia of Science and Technology, 1966 Volume 12 at pages 74–75, and including a photomultiplier as known to this art or Geiger counter with the appropriate amplification and readout mechanism.

The signal produced by detector 16 is applied to an amplifier 18 from where it is directed to the input of a conventional threshold or level detector circuit 20. Level detector 20 is calibrated to produce an output signal only when the signal applied thereto from amplifier 18 differs from a predetermined level. An electro-mechanical transducer 22, such as a solenoid, is arranged to respond to the output signal from level detector 20 and divert case 10 from conveyor 12, such as along path 24. Transducer 22 most conveniently accomplishes this by activating a device such as a gate. As shown in FIG. 2, a suitable device also includes lever arm 26, activated by the reject mechanism.

Referring to various aspects of the schematic diagram in more detail, and in a preferred embodiment as shown in FIG. 2, radiation source 14 is provided as four separate collimated beams of γ-rays staggered to overlie respective of staggered rows of containers 26, shown in phantom in FIG. 2 and in full in FIG. 3, as shipping cases 10 pass along conveyor 11. By controlling the size of the opening in the shield around each source 14, each of the collimated beams provides a band 28 of γ-rays corresponding in width to a portion of the width of the jars in each row, as case 10 is moved relative to respective of γ-ray sources 14. For example, a collimated beam providing γ-rays in a width of about 1 inch to 1 ½ inch is particularly suitable for scanning rows of 5-ounce baby food jars in a tight pack case containing a 4 × 6 configuration of jars.

Each of the sources 14 are arranged to continuously emit γ-rays. However, the sensing by detector 16 is controlled by pressure sensitive switches 30 and 32. When switch 30 is contacted by case 10, it activates the series of detectors 16 and the circuitry associated therewith. Thereafter, as case 10 advances along conveyor 11, it encounters switch 32 which overrides the signal from switch 30 and causes detectors 16 to be shut off. The spacing of switches 30 and 32 is such that detectors 16 will only be functioning during that time interval when a properly aligned and filled shipping case of jars 26 is directly below source 14. In this manner, any potential false signal created by the case voids present from the staggered jar arrangement will be eliminated or at least minimized. Employing the resulting signal as an indication of the condition of contents of the shipping case, the signal is translated into an electro-mechanical reactive force sufficient to reject the case. Typical of such force is lever arm 26, which when activated by the reject mechanism, causes case 10 to be removed from conveyor 11.

Each of the four separate γ-ray sorces can be mounted within individual small lead or tungsten tubes and the respective tube positioned in the center of a special scintillation detector phosphor having a diameter slightly larger than that of the tungsten tube. With this arrangement, optimum backscatter is obtained from the burst of energy emitted from the collimator.

Level detector 20 can consist of a meter relay wherein backscatter is translated to milliamps of direct current. Calibration of such an instrument by obtaining readings with cardboard shipping cases containing 5-ounce baby food jars, has provided the following readings: full jars — about 100 milliamp reading, quarter-full jars — about a 55 milliamp reading, empty jars — about a 15 milliamp reading, while voids and broken jars produce about a 0 to 5 millamp reading. Based upon such readings, the level of level detector 20 is calibrated to produce an output signal only when the readout is less than the equivalent of about 90 milliamps. Thus, transducer 24 will only be energized by level detector 20 when the case under examination does not contain the required number of essentially full jars. In this manner, cases properly packaged, filled and aligned will not be diverted or identified by the rejection mechanism.

In a further embodiment of the invention, it is contemplated that 24 collimation beams can also be arranged so as to simultaneously produce backscatter from locations directly over each of the 24 jars. With such an emission system, switch 30 is arranged to activate detectors 16 only momentarily during the passage of case 10 along conveyor 11, as the entire case can be scanned at once. In this manner, each case could be instantly monitored and thereafter either rejected or passed on through the conveyor line.

While the determination of transmitted radiation is similar to the determination of backscatter radiation, there are some differences. With transmitted radiation, one will sense enhanced radiation with partially empty or empty jars. The rapid and continuous movement of the cases past the detector will require different adjustments to relate the speed of the cases to the sensitivity of the detecting system.

The beam size will be determined by the source size and a plot of output versus distance along the case. The jar walls are a governing factor, as the glass is dense and will affect the reading as a probe is moved along the case. The jar walls are always in the field of view and cause the net signal strength decrease percentage-wise to be lower. This is due to the fact that as the jar empties, the average density in the field of view changes at a slower rate than would be expected if the glass has no effect. If the beam size is very narrow, the wall effects are reduced, but the beam size affects signal strength. Preferably, the beam width should be less than about two-thirds the jar cap diameter. (The beam width is the diameter of the beam at the plane of detection and is determined by the distance the γ radiation travels from the source through the collimator and the size of the opening at the end of the collimator).

In order to ensure a minimum widening of the beam width, both the source and detector will be maintained in relatively close proximity to the moving cases. Preferably, the detector should not be more than about an inch from the top of the case. By varying the strength of the source, the beam width, and the rate of movement of the cases, one can adjust the system to the particular sized jars and cases with which one is concerned.

Also, in the situation where transmission of the γ-radiation is being detected, a monitoring system should be provided so as to detect the beginning and the end of the cases. In any gaps between the cases, a high amount of radiation will be detected and the monitoring system should prevent the triggering of the rejection device.

Although only the above embodiments of the invention have been shown in detail, it will be understood by one skilled in the art that the invention only be limited by the scope of the attached claims.

What is claimed is:

1. Apparatus for monitoring a sealed opaque shipping case having a plurality of containers in a fixed pattern within said case to determine partially filled or absent containers, each of said containers when present and filled providing a predetermined impulse in response to a beam of γ-rays being directed into said opaque shipping case, comprising: a source of γ-ray radiation; means for moving said shipping case along a path relative to said source; means for directing a plurality of individual beams of said γ-rays at said shipping case, said beams being arranged in accordance with said fixed pattern, said individual beams each having a width no greater than the width of said containers, means for detecting the impulses produced as said individual beams are directed towards said shipping case, said detecting means being at a predetermined angle to said beam directing means; and isolating means responsive to the deviation of any one of said impulses from a predetermined level for isolating a shipping case, said deviation being indicative of an absent or partially filled container.

2. An apparatus in accordance with claim 1, wherein said detecting means is positioned so as to detect back-scattered impulses, and wherein said isolating means is responsive to an impulse lying below said predetermined level.

3. Apparatus in accordance withh claim 2, wherein said isolating means is adapted to produce an electrical signal when the output of said detector is less than said predetermined level, said apparatus being further characterized by electro-mechanical transducer means responsive to said electrical signal to divert said case from said path.

4. Apparatus in accordance with claim 2, wherein said moving means comprises a conveyor system for advancing said shipping case through said plurality of individual beams.

5. Apparatus in accordance with claim 2, wherein said source of γ-ray radiation is disposed adjacent said detecting means.

6. Apparatus in accordance with claim 2, wherein said pattern comprises four rows of containers and said apparatus has four individual sources of γ-ray radiation to provide detectable γ-ray beams for each of said four respective rows of containers.

7. Apparatus in accordance with claim 6, wherein means are further provided for activating said detector only during that time when a shipping case is positioned to provide said predetermined impulses.

8. Apparatus in accordance with claim 1, wherein said detector means is substantially in a straight line with said γ-ray beams, so as to measure the transmission of said γ-ray radiation through individual ones of said containers and detect any increase in γ-ray radiation resulting from the absence of a container or a partially filled container.

9. Apparatus in accordance with claim 8, wherein said means for moving said shipping case comprises means for moving a plurality of shipping cases in a substantially continuous manner and wherein said apparatus has means for detecting the beginning and ending of a shipping case so that said isolating means is not responsive to an impulse as a result of a gap between cases.

10. A process for determining a partially filled container or the absence of a container normally arranged in a fixed pattern in a sealed opaque shipping case, comprising the steps of: providing a source of γ-radiation; creating a plurality of unidirectional beams of γ-rays from said source, said beams being arranged in accordance with said fixed pattern; predetermining the amount of radiation produced at a detector located at a fixed angle from said source when said beams are directed into a sealed opaque shipping case enclosing a plurality of said filled containers arranged in said fixed pattern; moving shipping cases relative to said plurality of beams of γ-rays; detecting the quantity of γ-ray radiation incident to said detector as individual shipping cases are successively advanced through said plurality of beams of γ-rays; comparing said quantity of γ-ray radiation with said predetermined quantity of γ-ray radiation; and, separating any shipping case whenever said quantity of incident radiation deviates from said predetermined quantity by a threshold amount indicating a partially filled container or the absence of a container.

11. A process according to claim 10 further including the step of positioning said detector at an obtuse angle to said source to detect radiation transmitted through individual ones of said containers.

12. A process according to claim 10 further including the step of positioning said detector at an obtuse angle to said source to detect radiation transmitted through individual ones of said containers.

13. A process according to claim 12 wherein said angle is substantially 180 degrees.

14. A process according to claim 10 wherein the width of each said plurality of unidirectional beams is no greater than the width of individual ones of said containers.

* * * * *